United States Patent [19]  [11] 4,402,830
Pall  [45] Sep. 6, 1983

[54] CORRUGATED FILTER ELEMENT WITH EXTERNAL SPIRAL TAPE SUPPORT

[75] Inventor: David B. Pall, Roslyn Estates, N.Y.

[73] Assignee: Pall Corporation, Glen Cove, N.Y.

[21] Appl. No.: 339,264

[22] Filed: Jan. 13, 1982

[51] Int. Cl.³ .............................................. B01D 27/06
[52] U.S. Cl. ................................. 210/457; 210/493.2; 210/497.1; 210/505
[58] Field of Search ........ 210/457, 484, 485, 488–492, 210/493.1–493.5, 497.1, 505

[56] References Cited

U.S. PATENT DOCUMENTS

| | | | |
|---|---|---|---|
| 2,837,214 | 6/1958 | Kasten | 210/484 X |
| 2,988,227 | 6/1961 | Harms | 210/493.2 |
| 3,241,680 | 3/1966 | Humbert, Jr. | 210/484 |
| 3,246,765 | 4/1966 | Murphy et al. | 210/493.1 X |
| 3,376,979 | 4/1968 | Bair | 210/490 X |
| 3,442,392 | 5/1969 | Skelley | 210/491 |
| 3,520,417 | 7/1970 | Durr et al. | 210/493.1 |
| 3,570,675 | 3/1971 | Pall et al. | 210/457 |
| 3,752,321 | 8/1973 | McLaren | 210/493.1 |
| 4,154,688 | 5/1979 | Pall | 210/493.1 X |

FOREIGN PATENT DOCUMENTS 763917 12/1956 United Kingdom ............ 210/493.1

Primary Examiner—Robert H. Spitzer

[57] ABSTRACT

A corrugated cylindrical filter element is provided having an external spiral tape support, comprising a corrugated filter sheet material in the form of a cylinder having an end cap at each end of the cylinder sealingly bonded to the filter sheet material at that end, the corrugations of the filter sheet material having a tendency to become distorted and displaced with respect to each other under the conditions to which the material is subjected in use, and a relatively narrow strip to continuous high-modulus fiber-reinforced synthetic plastic tape spirally wound around the cylinder, spanning the corrugations and extending between each end and bonded to the end cap and to the tips of the corrugations in a manner to prevent distortion and displacement thereof.

14 Claims, 3 Drawing Figures

FIG. 1
FIG. 3
FIG. 2
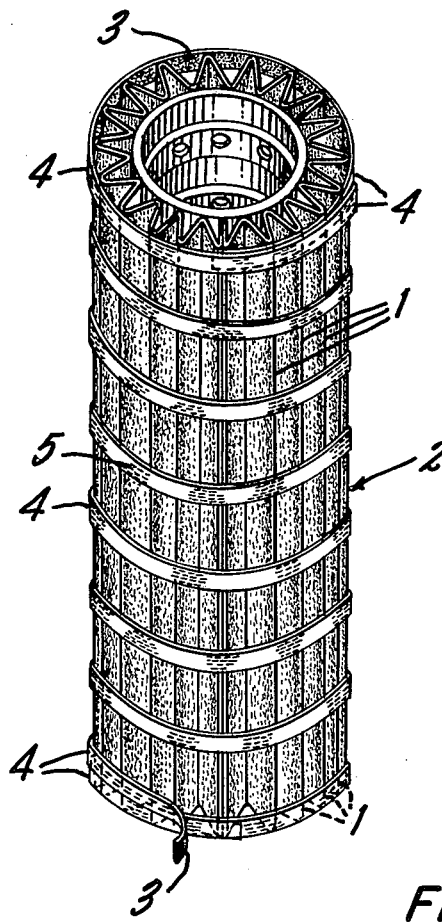
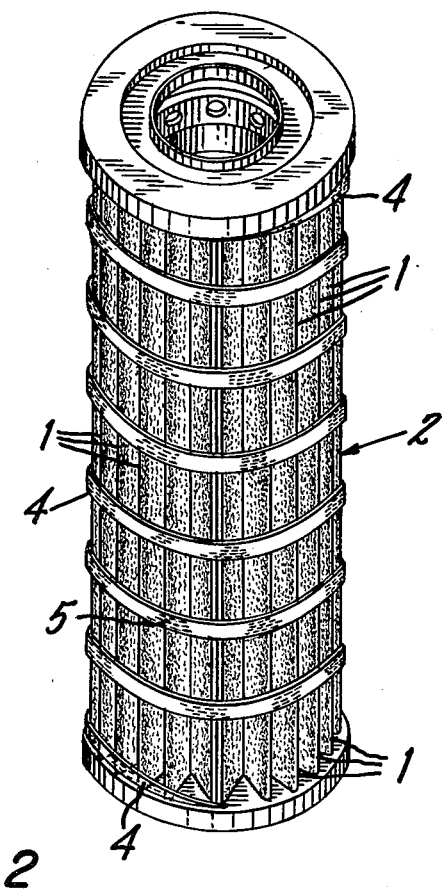
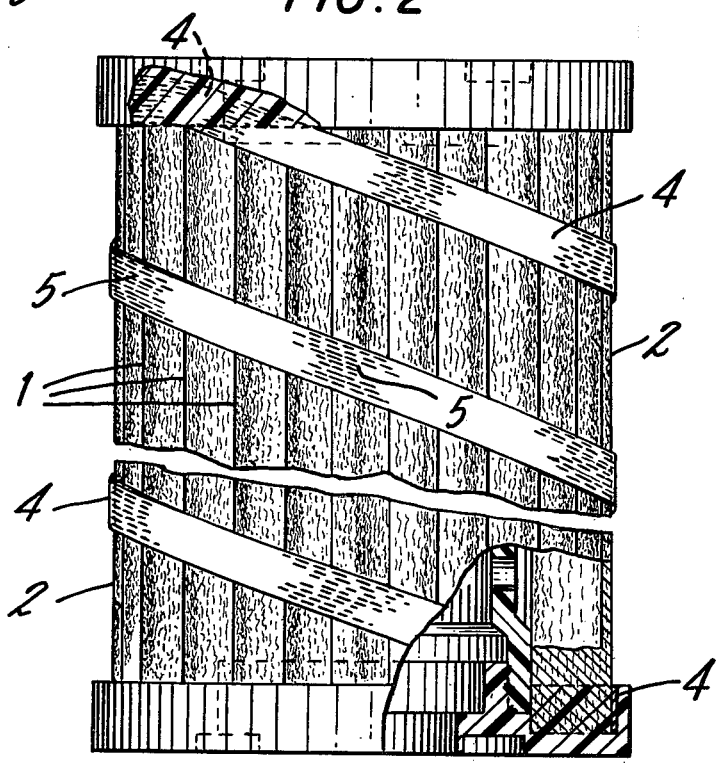

CORRUGATED FILTER ELEMENT WITH EXTERNAL SPIRAL TAPE SUPPORT

Corrugated filter elements which are designed for use in high pressure fluid systems must, of necessity, possess sufficient strength to withstand the fluid pressure to which they are subjected during use. As the contaminants accumulate upon the element, the differential pressure resulting from such accumulation increases, causing the corrugations to become distorted or displaced, or even to collapse, reducing the contaminant capacity of the filter element by 25% or more, and requiring that the element be replaced prematurely. This problem is particularly acute when the filter element is made of a very fine wire mesh, thin plastic membrane paper sheet, or other structurally weak material.

Further, the elements are attached to or inserted into a variety of housings, and must withstand without damage the stresses imposed on them during assembly and removal. Examples of such stresses are the axial load imposed when an O-ring seal at the element open end is forced into its socket, and the torque imposed when a threaded end fitting is made up.

A corrugated mesh filter element of fine wires can be strengthened by interposing a coarser mesh material of heavy wires between or upon the mesh of finer wires. Wires of larger diameter can also be interwoven with the finer wires. Both these expedients reduce the open pore area, and thus to a certain extent are self-defeating because reduction in pore area increases pressure drop across the filter, and a lower contaminant capacity results as well. The problem is to provide a sufficient resistance to distortion without reducing porosity, or increasing the pressure drop across the filter, or reducing contaminant capacity.

Pall, Verrando and Silverwater U.S. Pat. No. 3,165,473, patented Jan. 12, 1965, provide a corrugated metallic filter element having superior resistance to distortion, a high contaminant capacity, and a substantially undiminished open pore area, comprising a corrugated foraminous metallic material which has a tendency to become distorted under the conditions to which it is subjected to use, and a relatively narrow metallic cross-strip bonded to a surface thereof and following the corrugated contour of the sheet, in and out of the corrugations thereof in a manner to prevent distortion thereof.

Humbert U.S. Pat. No. 3,241,680 shows a corrugated cylindrical filter element having spiral wrap of string or twine, which is glued to the tips of the corrugations. The spiral wrap does not extend into the end cap bonding area, so far as the drawings show. The string or twine has strength under tension, but readily collapses when stressed axially in the opposite direction, that is, under compression. For that reason, the use of string or twine has been proven to be unsatisfactory when applied to elements having corrugations which are made using less rigid filter media. With such filter media, string or twine-reinforced elements tend to collapse, due to compression by the hands of the operator, while being assembled or disassembled from their housings, with consequent damage to the filter element.

Murphy et al U.S. Pat. No. 3,246,765 shows an inside-out filter cartridge in which the corrugated filter element is enclosed within two concentric foraminous tubes. The corrugated element is held in position by a plurality of adhesive strips, disposed between the upstream support tube and the filter element. The filter element has the undesirable feature that a substantial amount of filter area is blocked by the foraminous upstream support, and further, the adhesive strips both block area on the filter and close off a substantial number of apertures in the foraminous upstream support. Moverover, the adhesive strips shown by Murphy must be applied by hand, and therefore involve a time-consuming and costly assembly.

Fricke et al U.S. Pat. No. 2,749,265 shows a corrugated filter sheet bonded to a foraminous core by cement that is applied to the core as a layer of sheet cement. Fricke et al disclose no perforations or holes in this sheet cement, but apparently Fricke et al intended the sheet to disintegrate when heated, as can be seen by reference to FIG. 7 of the Fricke et al patent.

U.S. Pat. No. 3,570,675, patented Mar. 16, 1971 to David B. Pall and Tadas K. Jasaitis, provides a corrugated cylindrical filter element in which a cylindrical filter sheet is supported on a central core. A perforated plastic bonding sheet is disposed between the core and the filter. The bonding sheet is bonded in situ to the inner tips of the corrugations only, so that this provides resistance to back pressure but not to distortion or displacement of the corrugation folds.

In accordance with the present invention, a corrugated cylindrical filter element is provided comprising a corrugated filter sheet material in the form of a cylinder having an end cap at each end of the cylinder sealingly bonded to the filter sheet material at that end, the corrugations of the filter sheet material having a tendency to become distorted and displaced with respect to each other under the conditions to which the material is subjected in use, and a relatively narrow strip of continuous high modulus fiber-reinforced tape of synthetic plastic material spirally wound around the cylinder, spanning the corrugations and extending between each end, and bonded to the end cap and to the tips of the corrugations in a manner to prevent distortion and displacement thereof.

The continuous high modulus fiber-reinforced tape of synthetic plastic material serves as an external spiral support for the corrugations and imparts an impressive rigidity to the element. It accordingly makes unnecessary other external supports such as foraminous cylindrical sheaths or tubes, although such supplemental supports can also be used, if desired.

Continuous high modulus glass fiber-filled synthetic plastic tape is commercially available, with or without a pressure sensitive facing, and has a continuous warp of glass filaments or fibers extending lengthwise, embedded in a matrix of the synthetic plastic tape material. The tape is relatively thin, in the range from 0.1 to 0.4 mm, with glass fibers or filaments of a diameter less than this, so as to be embedded therein. The tape is also relatively narrow, in the range from 3 to 8 mm, so as to block off as little as possible of the filter surface area at the corrugation tips to which it is bonded.

The tape can be made with a continuous high modulus warp of materials other than glass fiber, for example carbon, Kevlar or high strength steel fibers could be used. Fibers with modulus in excess of about $5 \times 10^6$ psi are preferred, and it is further preferred that all of the fibers be oriented lengthwise, parallel to the tape.

Any suitable plastic can be used, provided that it has good aging properties when exposed to air and a variety of liquids, and providing it adheres well, or can be made to adhere well, to the reinforcing fiber.

The adhesive can be applied at the time of laydown, and may be of the hot melt, solvent, emulsion, or pressure-sensitive type. An aggressive, very tacky glass fiber pressure-sensitive tape, of the type commercially available from companies such as Minnesota Mining and Manufacturing Company and widely used for package sealing, is preferred. An example is No. 890 filament tape, a packaging tape, which is a "Scotchpar" film backed tape reinforced with continuous glass yarn filaments.

Synthetic thermoplastic materials that can be used are film-forming, and can be shaped into flexible strong tape form. Suitable thermoplastic materials include polypropylene, polyethylene, polyisobutylene, polyesters, polyamides, cellulose acetate, copolymers of vinyl chloride and vinyl acetate, polyvinyl chloride, polyvinylidene chloride, polyvinyl butyral, polystyrene, polytrifluorochloroethylene, synthetic rubbers such as butadiene-styrene and ABS polymers.

The corrugated filter sheet of the instant element can comprise any of the filter sheets known to those skilled in the art, and can be made from any filter medium. Fibrous filter sheets made of materials such as paper, asbestos, paper-asbestor combinations, textile fibers, regenerated cellulose, microcrystalline cellulose, casein fibers, zein fibers, cellulose acetate, viscose rayon, hemp, jute, linen, cotton, silk, wool, mohair, glass, polyvinyl chloride, polystyrene, polyethylene, polypropylene, and polyacrylonitrile are generally preferred. A fibrous filter sheet can be woven, or it can be nonwoven, such as a felt, mat or bat. The filter can also comprise a plurality of woven and/or nonwoven layers, and can be resin-impregnated.

The filter sheet can also comprise a fibrous or nonfibrous base upon which a fibrous and/or particulate layer is laid down. Preferable examples are disclosed in U.S. Pat. Nos. 3,246,767 to Pall et al, and 3,238,056 to Pall. Other filter media, such as wire meshes of stainless steel, sintered stainless steel, brass, Monel, iron, copper, aluminum and plastic can be used. These can have a fibrous or particulate material bonded thereto. Examples of a suitable metallic filter element are disclosed in U.S. Pat. Nos. 2,925,650 to Pall and 3,241,681 to Pall. Thin plastic filter membranes of cellulose acetate, polyamides, polypropylene, polyethylene, polysulfone, polyimides, and polyesters can be used.

The filter sheet is corrugated and is formed in a closed configuration as a corrugated tube about a temporary or permanent support or core. The side seam of the filter sheet can then be sealed, and the composite is ready for bonding of the tips of the corrugated filter sheet to the tape.

The tape in the completed assembly bonds the tips at the corrugations of the filter sheet in a fixed relation to each other. By forming such a bond, the filter element is given lateral support. This is due to the fact that substantially each corrugation in this assembly is bonded to the tape and held in a fixed relation thereto. Thus each corrugation can no longer flex away from the next, and the external periphery of the filter element therefore has a fixed circumference.

Further, due to the high modulus and parallel disposition of the reinforcing fibers, each short section of tape joining the tips of two corrugations has high column strength, and cannot be readily compressed. Probably for this reason, a filter comprising a relatively non-rigid corrugation combined with the tape winding of this invention feels and behaves similar to a filter made with a more rigid filter medium, and can be manipulated and stressed without the damage which would otherwise tend to occur. The importance of the high column strength can be seen when a pressure sensitive tape backed by woven cloth, or made without reinforcement is used on the same basic corrugated element; the product is limp and collapses readily when compressed or otherwise manipulated and may be damaged as a result.

This difference in behavior manifests itself particularly when the filter medium is thin, and itself relatively non-rigid and is deeply pleated. An example of such a filter medium is a lightly resin-bonded glass fiber laid down on a thin supporting medium such as a cellulosic paper, or on Reemay (a non-woven polyester made by DuPont) of low basis weight. The use of thin media as contrasted with thick, rigid medium results in more pleats for a given element size, hence more effective filter area. The use of low resin content, as contrasted with high resin content to get rigidity, is also preferred, as the resulting filter medium has higher open area, hence lower clean pressure drop and higher service life. Deep pleats also add surface area, hence result in increased service life for an element of a given size.

It should be understood that the use of continuous high modulus warp filled tape will benefit any element by making it more rigid, but that the additional rigidity is most useful when applied to deeply pleated elements made with relatively thin non-rigid media.

The tape is first spirally wound tightly about the filter cylinder, from end to end. Before so doing, a bonding agent or adhesive can be applied to the inner surface of the tape, in contact with the cylinder. A pressure-sensitive adhesive-backed tape can also be used. After doing so, the end caps are bonded to the filter cylinder. The tape may extend into the end bonding area, in which case the tape is bonded too, in the seal, using either a bonding agent, or embedding or potting the cylinder end in the end cap material. In this embodiment, the end cap has a peripheral flange, and the circumferential wrap is within the flange.

If the tape is made of a thermoplastic material, the assembly of the temporary support, the tape and the filter element can be subjected to an elevated temperature appropriate to soften the plastic. This causes the tape to soften and the corrugation tips become embedded therein. When the tape cools, the corrugations of the filter sheet are bonded to the sheet such that each corrugation is fixed relative to the next, in a continuous manner, across the corrugations and along the length of the sheet.

The temperature to which a thermoplastic or thermosetting tape is exposed is determined by the particular plastic used; the softening points and curing temperatures are well known to those skilled in the art. The material should not be melted except at the surface, since there otherwise is danger of disintegration.

If a plastic tape softened by a solvent is used, the entire assembly of the temporary support, the tape and the filter sheet can be immersed in a solvent bath. The plastic sheet is softened thereby, and the corrugation tips become imbedded therein. When the solvent evaporates, the bonding sheet hardens, and it bonds the corrugations of the filter element together in the manner described above.

The side seam of a corrugated filter sheet can also be sealed by applying a strip or layer of a bonding agent, such as a thermosetting resin, a resin cured by a curing agent, liquid or semisolid thermoplastic material and the like, between side edges of the filter sheet.

By using the same or a similar bonding agent for both the tape, the end caps and the side seam, valuable time can be saved in the manufacture of the filter element. For example, if the corrugations are fixed by a thermoplastic tape, a thermosetting resin can be disposed along the side seam of the filter sheet. When heat and pressure are applied to the package, curing of the resin takes place. The filter sheet thus is sealed along its side seam and when the thermoplastic sheet cools, its corrugations are bonded together.

When the sheet undergoes solidification by cooling, evaporation of a solvent, polymerization, cross-linking or the like, the temporary support is replaced by the permanent support core. This can readily be accomplished since the temporary support is not bonded to the corrugated filter sheet.

The selection of the core and material used therefor are not dependent upon the bonding agent used to bond the tape to the filter element, since the corrugated filter sheet is not bonded to the core. The core need not be placed within the filter element until the bonding operation is completed.

The core generally can be of any material, including metals such as aluminum, magnesium, stainless steel, steel, brass, iron, and alloys including these, and the like. Ceramic cores and polycarbonate cores can also be used. Plastic cores made of other materials such as polyvinyl chloride, polypropylene, polyethylene, phenol-formaldehyde, urea-formaldehyde, polystyrene, nylon, polytetrafluoroethylene, and the like are also suitable for use in the instant filter assembly. The material used for the core and its thickness will be selected by reference to the strength needed to withstand the pressures encountered in a particular fluid system.

The permanent support core is preferably generally tubular in shape. However, it can be formed in any shape desired. All that is necessary is that the core fit within or around the filter element and have an open interior passage of fluid therethrough.

The core can be formed with a smooth surface or it can be formed with a plurality of circumferential alternately raised and depressed portions along its length. These portions can be defined by a series of circumferential grooves or circumferential troughlike indentations in the surface of the core. The distance between one raised portion and the next preferably should not exceed two inches. This configuration facilitates the passage of fluid through the filter element since it reduces the amount of filter area blocked by the core and provides flow paths for the fluid.

The core has a plurality of holes therethrough, well distributed along its length, in sufficient number to permit the passage of fluid from the filter element through the core. The number and size of the holes are determined by the acceptable pressure drop through the filter element. These, in the preferred embodiment, are disposed in the depressed portions of the core. This construction facilitates the passage of fluid through the core. The higher the acceptable pressure drop, the fewer the number of and the smaller the holes that need be provided.

To remove the temporary support and replace it with the permanent core, the permanent core can be placed with its butt end against the temporary support and forced axially against it. This forces the temporary support outwardly from the tubular corrugated sheet, and replaces it with the permanent support. This can be accomplished manually, pneumatically, or by any other means known to those skilled in the art. It has been found advantageous to use a guide, such as a centering piece or boss to facilitate the removal of the temporary support member and the insertion of the permanent core into position.

Naturally, if a permanent support that is deflatable or contractable is used, the temporary support need not be forced from the assembly but can be merely removed and replaced by the permanent support core.

When the temporary support is removed, and the permanent support core has replaced it, the filter element is completed.

If heat bonding is used, the permanent core can be introduced into the assembly before the filter assembly becomes completely cooled. In such a case, after the permanent core is introduced and the assembly cools further, the bonding sheet will contract and tightly grip the permanent core.

The corrugations of the completed filter element are bonded to the tape and held thereby in a fixed relation to each other, such that they no longer are free to flex relative to each other. Thus, they will not be able to move away or be displaced away from the core, and the complete element will resist back pressures. However, since the corrugations of the filter sheet are not bonded to the permanent core and since it is not exposed to the method of bonding or the bonding agent used, the permanent core can be of any desired material.

The various stages in the preparation of a filter element incorporating a corrugated filter sheet material and spirally wound tape in accordance with the invention are illustrated in the drawing, in which:

FIG. 1 is a fragmentary view in perspective of a corrugated filter sheet material in the form of a cylinder or cartridge; and having a tape spirally wound thereover and bonded thereto and ready for application of end caps to form a cylindrical filter element;

FIG. 2 is an enlarged fragmentary view of the filter cylinder of FIG. 1, showing how the end caps are bonded to the cylinder; and FIG. 3 is a fragmentary view in perspective of the finished filter cartridge, ready for use as a filter element.

To the corrugation tips 1 of the corrugated filter sheet 2, best shown in FIG. 1, is bonded, such as by a pressure-sensitive adhesive backing layer 3, a tape 4 of glass fiber-reinforced "Scotchpar" film. The glass fibers are actually a warp 5 of glass yarn filaments extending lengthwise of the tape, and the tape is 6 mm wide and 0.012 mm thick. The tape does not reduce appreciably the flow area of the sheet, because of the narrowness of the tape. The tape spirals are parallel to each other, and terminate in one circumferential wrap about each end of the filter cylinder in the end cap bonding area.

Next, the end caps are applied to each end of the filter cylinder, as seen in FIG. 2, melt-bonding the end caps to the ends over the ends of the tape, using the process of U.S. Pat. No. 3,354,012, patented Nov. 21, 1967, to Foreman and Pall, producing the structure shown in FIG. 3.

It will, of course, be apparent that the corrugated structure of FIG. 3 need not be in cylindrical form, but could be employed in any closed tubular shape, as required by the particular filter unit in connection with which it is to be used. It will also be apparent that the tape can be applied after the element has been side sealed and end capped.

Having regard to the foregoing disclosure the following is claimed as the inventive and patentable embodiments thereof:

1. A corrugated cylindrical filter element comprising a corrugated filter sheet material in the form of a cylinder and having an end cap at each end of the cylinder sealingly bonded to the filter sheet material at that end, the corrugations of the filter sheet material having a tendency to become distorted and displaced with respect to each other under the conditions to which the material is subjected in use; and a relatively narrow strip of continuous high modulus fiber-reinforced tape of synthetic plastic material spirally wound around the cylinder, spanning the corrugations and extending between each end and bonded to the end cap and to the tips of the corrugations in a manner to prevent distortion and displacement thereof.

2. A filter element in accordance with claim 1, in which the tape is made of thermoplastic material.

3. A filter element in accordance with claim 1, in which the tape is made of polypropylene.

4. A filter element in accordance with claim 1, in which the end caps are made of thermoplastic material.

5. A filter element in accordance with claim 1, having within the cylinder of filter material a core made of a thermoplastic material.

6. A filter element in accordance with claim 5, in which the end caps and core are made of polypropylene.

7. A filter element in accordance with claim 1, in which the corrugated filter sheet is made of paper.

8. A filter element in accordance with claim 1, in which the filter sheet is made from a material that comprises a porous base having a microporous layer adhered thereto.

9. A filter element in accordance with claim 1, in which the fibers are glass filaments.

10. A filter element in accordance with claim 9, in which the glass filaments are in the form of a warp extending longitudinally of the tape.

11. A filter element in accordance with claim 1, in which the tape is from about 0.1 to about 0.4 mm thick and from about 3 to about 8 mm wide.

12. A filter element in accordance with claim 1, in which the tape is a pressure sensitive adhesive tape.

13. A filter element in accordance with claim 1, in which the tape spirals terminate in a circumferential wrap at each end of the filter cylinder within the end cap-to-cylinder bonding area.

14. A filter element in accordance with claim 13, in which the end cap has a peripheral flange and the circumferential wrap is within the flange.

* * * * *